United States Patent [19]
Yoshino et al.

[11] Patent Number: 5,262,810
[45] Date of Patent: Nov. 16, 1993

[54] FILM WINDING SYSTEM

[75] Inventors: Tsunemi Yoshino, Nara; Hajime Mitsui, Izumi, both of Japan

[73] Assignee: West Electric Company Ltd., Osaka, Japan

[21] Appl. No.: 946,541

[22] Filed: Sep. 17, 1992

[30] Foreign Application Priority Data

Sep. 19, 1991 [JP] Japan .................. 3-239455

[51] Int. Cl.$^5$ .................. G03B 1/12; G03B 1/40
[52] U.S. Cl. .................. 354/173.1; 354/212; 242/71
[58] Field of Search .............. 354/173.1, 173.11, 212; 242/71

[56] References Cited

U.S. PATENT DOCUMENTS

| | | | |
|---|---|---|---|
| 4,274,726 | 6/1981 | Yoneyama et al. | 354/173.1 |
| 4,949,109 | 8/1990 | Shimada et al. | 354/173.1 |
| 4,959,672 | 9/1990 | Yoshino et al. | 354/173.1 |
| 5,091,740 | 2/1992 | Hori | 354/173.1 |
| 5,142,313 | 8/1992 | Haraguchi et al. | 354/173.1 |
| 5,172,148 | 12/1992 | Ezawa | 354/173.1 |

Primary Examiner—Michael L. Gellner
Assistant Examiner—Jae N. Noh
Attorney, Agent, or Firm—Renner, Otto, Boisselle & Sklar

[57] ABSTRACT

A film winding system has a spool which houses a motor as a driving source and a driving force conveying mechanism including an epicycle gear. The driving force conveying mechanism for conveying the driving force from the motor to the spool further includes a clutch mechanism for facilitating film removal from the spool effected by pulling the film, without cutting the film or breaking gears.

3 Claims, 1 Drawing Sheet

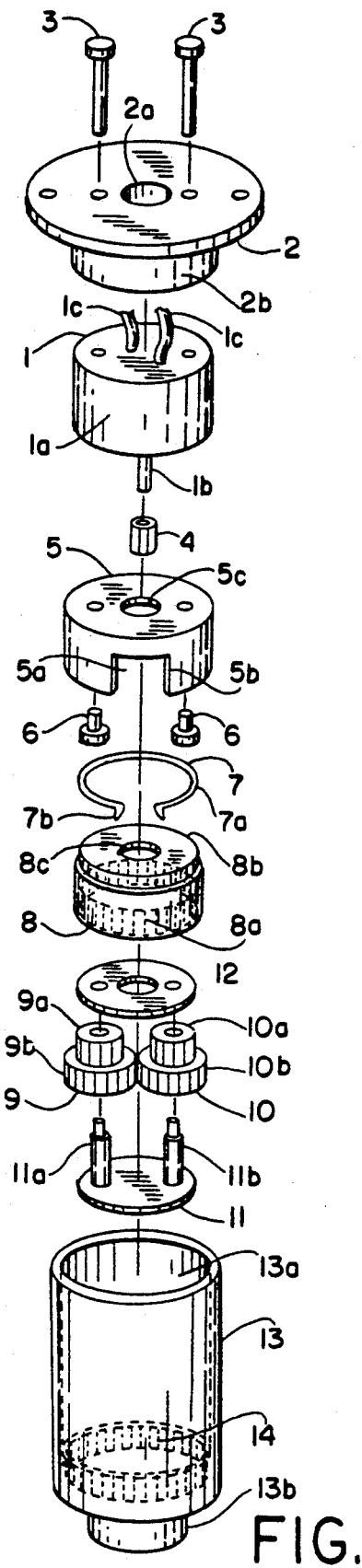
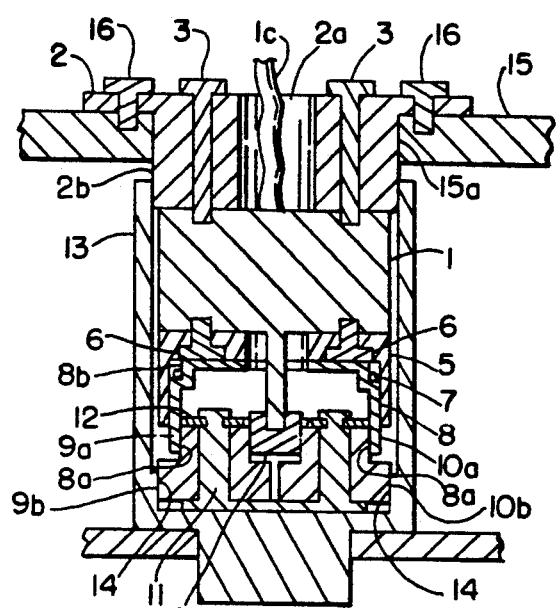
FIG. 1
FIG. 2
FIG. 3
FIG. 4

FILM WINDING SYSTEM

BACKGROUND OF THE INVENTION

1. Field of the Invention

The present invention relates to a spool-driven film winding system for automatically winding a film loaded in a camera by a spool to which the driving force of a motor as a driving source is conveyed. In particular, the present invention relates to a film winding system having a spool which incorporates a driving mechanism including the motor.

2. Description of the Prior Art

In a spool-driven film winding system, the driving force of a motor as a driving source is conveyed to a spool through an appropriate decelerating mechanism, thereby winding a film loaded in a camera. It is known that this type of film winding system can have a simpler construction than that of a sprocket wheel-driven system in which the driving force of the motor is conveyed to a sprocket wheel.

It is also known that the spool-driven system has a motor in the shaft of the spool to reduce the size of the camera.

For conveying the driving force of the motor, a construction in which the driving force is once conveyed outside the spool and then conveyed back to the spool is generally used.

In such a construction, members for conveying the driving force should be positioned in the camera with high precision. In order to avoid such trouble, a construction has recently been proposed, in which the driving force of the motor is conveyed to the spool without once conveying it outside. In such a construction, all the members are incorporated in the spool.

Japanese Laid-Open Patent Publication No. 2-22635 discloses an example of a film winding system having the above construction. According to this system, one through four epicycle gears are used for a compact decelerating mechanism which is incorporated in a spool with a motor, and an inner gear on an output section of the mechanism is integrated with the spool.

In the above conventional film winding system, the mechanical connection for winding a film between a motor as a driving source and a spool is released only when a film rewinding operation which is considered to be normal in the state of general use is required, for example, when all the frames of a film are wound.

Accordingly, the above conventional film winding system involves the following problems. For example, in the case when only the frames which have already been used are to be removed and the remaining frames are to be kept for future use, usually a rear cover of the camera is opened in a dark room to remove the film from the spool and only the frames which have already been used are cut off. Such an operation, which is effected when one or more frames still remain unexposed, is not considered to be normal. Accordingly, the mechanical connection between the motor and the spool is not released in this case. Instead, gears between a pinion provided on an output shaft of the motor and the inner gear are still in an engaged state.

The film is removed from the spool against the mechanical connection, namely, in the state where the mechanism which acts as a decelerating mechanism for winding the film acts, instead, as an accelerating mechanism. Accordingly, rotation of the spool requires a huge rotating driving force, with the possibility of cutting the film or breaking teeth on the gears of the conveying mechanism.

Such a film removal is also effected for in-house production inspection using a test film. The same accidents may occur.

SUMMARY OF THE INVENTION

The film winding system according to the present invention includes a spool having a cylindrical shape and rotatably provided in a camera main body; a motor provided in the spool and having a main body fixed in the camera main body; a pinion fixed on an output shaft of the motor; at least one epicycle gear rotating around the pinion; a first inner gear in engagement with the epicycle gear; a second inner gear provided on an inner peripheral surface of the spool and engaged with the epicycle gear; and a clutch mechanism for connecting the first inner gear to the motor through a specified friction and for rotating the first inner gear with respect to the motor when a rotation torque larger than the friction is applied to the first inner gear.

Thus, the invention described herein makes possible the advantages of providing a spool-driven film winding system according to which a film can be removed when necessary without cutting the film or breaking gears.

These and other advantages of the present invention will become apparent to those skilled in the art upon reading and understanding the following detailed description with reference to the accompanying figures.

BRIEF DESCRIPTION OF THE DRAWINGS

FIG. 1 is an exploded view of an essential part of a film winding system according to the present invention.

FIG. 2 is an enlarged cross sectional view of the film winding system of FIG. 1 in the state of being assembled.

FIG. 3 is an enlarged plan view of an essential part of the film winding system of FIG. 1.

FIG. 4 is an enlarged view of an essential part of another film winding system according to the present invention.

DESCRIPTION OF THE PREFERRED EMBODIMENTS

Hereinafter, the present invention will be described by way of illustrating examples with referrence to the accompanying drawings.

EXAMPLE 1

FIGS. 1 and 2 show a film winding system according to a first example of the present invention.

A main body 1a of the motor 1 is attached to a base 2 through pins 3, and the base 2 is fixed on a camera main body 15 through pins 16 as is shown in FIG. 2.

The base 2 has a hole 2a at a center thereof, through which feeding lines 1c are inserted for feeding power to the motor 1. A projecting portion 2b of the base 2 is inserted into a hole 15a of the camera main body 15 (FIG. 2), thereby fixing the motor 1 to the camera main body 15 (FIG. 2). The projecting portion 2b also acts as a rotating shaft of a spool 13 as mentioned later.

An output shaft 1b of the motor 1 is inserted into a pinion 4 for conveying the driving force of the motor 1. A sleeve 5 is fixed to the motor 1 through pins 6. The sleeve 5 has a housing 5a which houses a first inner gear 8 and the like and a groove 5b for engagement with projecting portions 7b of an elastic ring 7. The sleeve 5 further has a hole 5c at a center thereof, through which the pinion 4 and the like are inserted.

The elastic ring 7 includes a ring portion 7a having a diameter smaller than an outer diameter of a step portion 8b of the first inner gear 8 and the projecting portions 7b for engagement with the sleeve 5. The step portion 8b is held within the ring portion 7a, whereby the elastic ring 7 is attached to the first inner gear 8.

The first inner gear 8 includes a gear portion 8a formed along an inner periphery thereof and the step portion 8b provided on a flat surface thereof. The first inner gear 8 further has a hole 8c at a center thereof, through which the pinion 4 and the like are inserted. The elastic ring 7 and the first inner gear 8 are housed in the sleeve 5 in the state where the step portion 8b is held by the ring portion 7a. At this point, the groove 5b and the projecting portions 7b are kept sufficiently close to be engaged with each other. The sleeve 5, the first inner gear 8 and the elastic ring 7 constitute a clutch mechanism.

An axis plate 11 has two rotating shafts 11a and 11b. Two epicycle gears 9 and 10 are rotatably attached to the rotating shafts 11a and 11b, respectively and are supported by the axis plate 11 and a bearing plate 12 which are attached at tips of the rotating shafts 11a and 11b by caulking or the like.

The epicycle gears 9 and 10 respectively include first gear portions 9a and 10a and second gear portions 9b and 10b. The first gear portions 9a and 10a are engaged with the gear portion 8a of the first inner gear 8. The second gear portions 9b and 10b are engaged with a second inner gear 14 and have different number of teeth from the first gear portions 9a and 10a.

A spool 13 includes a housing portion 13a which is a hollow cylinder which houses the motor 1, the sleeve 5, the first inner gear 8, the epicycle gears 9 and 10, and the like. The housing portion 13a includes the second inner gear 14 formed along an inner periphery thereof.

The spool 13 further includes a projecting portion 13b at an end thereof, which is inserted into the hole 15a of the camera main body 15 (FIG. 2). The other end of the spool 13 is inserted into the projecting portion 2b of the base 2. According to this construction, the spool 13 is rotatably attached to the camera main body 15 through the projecting portion 2b, which acts as the rotating shaft of the spool 13.

An example of the operation of a film winding system having the above-mentioned construction will now be described.

When power is fed to the motor 1 from a power source (not shown) through the feeding lines 1c, the motor 1 starts driving. Although the main body 1a fixed to the camera main body 15 through the base 2 cannot be rotated, the output shaft 1b is rotated. The pinion 4 attached to the output shaft 1b is rotated accordingly, thereby conveying a rotating driving force from the motor 1 to the other members of the system.

The rotating driving force of the motor 1 is conveyed to the epicycle gears 9 and 10 through the connection between the pinion 4 and the first gear portions 9a and 10a. The rotating driving force is further conveyed to the first inner gear 8 through the gear portion 8a engaged with the first gear portions 9a and 10a, and further to the spool 13 through the second inner gear 14 engaged with the second gear portions 9b and 10b.

FIG. 3 is an enlarged plan view of an essential part of the film winding system of FIG. 1. As is apparent from FIG. 3, the first inner gear 8 is housed in the housing 5a of the sleeve 5 together with the elastic ring 7. The groove 5b of the sleeve 5 and the projecting portions 7b of the elastic ring 7 are kept sufficiently close to be engaged with each other.

When a rotating driving force in a direction of an arrow A is conveyed to the first inner gear 8 through the pinion 4 and the first gear portions 9a and 10a, the first inner gear 8 is rotated together with the elastic ring 7, thereby contacting an end $7b_1$ of the projecting portion 7b and an end $5b_1$ of the groove 5b.

At this point, the first inner gear 8 receives a friction which is determined by a sum of a holding force of the ring portion 7a against the step portion 8b and a fastening force generated by the contact between the end $7b_1$ and the end $5b_1$. In other words, the friction is determined by the clutch mechanism.

In the case when the rotating driving force conveyed to the first inner gear 8 is smaller than the friction, more precisely, in the case when the rotating driving force is smaller than a sum of the friction and a pulling torque which is necessary to remove the film from a cartridge by the spool 13, the above contact prevents the rotation of the first inner gear 8.

On the other hand, in the case when the rotating driving force is larger than the pulling torque, the first gear portions 9a and 10a are rotating about the rotating shafts 11a and 11b while rotating along the inner periphery of the first inner gear 8 around the pinion 4 together with the axis plate 11 and the bearing plate 12. Namely, the epicycle gears 9 and 10 rotate on their axes while rotating around the pinion 4 acting as a sun gear. By such an operation, a rotating driving force is conveyed to the second inner gear 14 through the second gear portions 9b and 10b. The rotating driving force conveyed to the second inner gear 14 is different from the force conveyed to the first inner gear 8 in proportion to the difference in the number of the teeth between the first gear portions 9a and 10a and the second gear portions 9b and 10b.

By the rotating driving force conveyed to the second inner gear 14, the spool 13 having the second inner gear 14 is rotated. Accordingly, the rotation of the spool 13 can be utilized for winding the film.

In the film winding system according to the first example of the present invention, film winding can be effected by setting a rotating driving force conveyed from the motor 1 to the first inner gear 8 to be smaller than a sum of the friction and the pulling torque and but larger than the above pulling torque. As mentioned before, the friction is determined by a sum of a holding force of the ring portion 7a against the step portion 8b and a fastening force generated by the contact between the end $7b_1$ and the end $5b_1$. The pulling torque is a force which is necessary to remove the film from a cartridge by the spool 13.

Next, an operation for removing the film out of the spool 13 in the state where the film is still wound around the spool 13 will be described.

An external force for pulling the film from the spool 13 is conveyed in the opposite direction from the case for winding the film, namely, from the second inner gear 14, to the epicycle gears 9 and 10, to the clutch mechanism including the sleeve 5, the first inner gear 8 and the elastic ring 7, and then to the pinion 4.

When the external force is conveyed to the first inner gear 8 from the spool 13 in a direction of an arrow B (FIG. 3), the first inner gear 8 is rotated in the direction of the arrow B together with the elastic ring 7, thereby contacting an end $7b_2$ of the projecting portion 7b and an end $5b_2$ of the groove 5b.

At this point, the first inner gear 8 receives friction which is determined by a sum of a holding force of the ring portion 7a against the step portion 8b and a fastening force generated by the contact between the end $7b_2$ and the end $5b_2$.

In the case when the external force from the spool 13 which is accelerated by the epicycle gears 9 and 10 and conveyed to the first inner gear 8 is smaller than the above friction determined by the clutch mechanism, the second inner gear 14 and the epicycle gears 9 and 10 are not rotated. When the second inner gear 14 is not rotated, the spool 13 is not rotated, either. Apparently, the film cannot be removed. Accordingly, the force for pulling the film should be increased to apply a larger force to the spool 13.

In the case when the external force conveyed to the spool 13 is larger than the friction, the clutch mechanism is operated to rotate the first inner gear 8 against the friction.

When the first inner gear 8 is rotated, the epicycle gears 9 and 10 engaged with the first inner gear 8 and the second inner gear 14 engaged with the epicycle gears 9 and 10 are rotated. Then, the spool 13 is rotated. In this state, the film can be removed.

Since the first inner gear 8 is rotated and thus is not fixed, the epicycle gears 9 and 10 cannot rotate on their axes, namely cannot rotate about the rotating shafts 11a and 11b.

Accordingly, the epicycle gears 9 and 10 are rotated together with the first inner gear 8, the axis plate 11, the bearing plate 12, the spool 13 incorporating the second inner gear 14, and the pinion 4, without rotating on their axes, namely, changing the engagement state with the pinion 4 and with the second inner gear 14. In other words, the spool 13 incorporating the second inner gear 14, the epicycle gears 9 and 10, the axis plate 11, the bearing plate 12, the pinion 4, and the first inner gear 8 are integrally rotated.

In the case when the friction for connecting the first inner gear 8 to the motor 1 is set so as to prevent the film and the gears from being broken, for example, in the case when the above friction is set to be lower than such a level as to break the gears, the first inner gear 8 starts rotating before the rotation torque conveyed to the first inner gear 8 is increased to be sufficiently large to break the gears. The spool 13 also starts rotating before the force conveyed to the spool 13 is increased to such a level. As a result, the film and the gears are not applied with a force sufficiently large to break the film or the gears when the film is removed from the camera.

EXAMPLE 2

FIG. 4 shows an essential part of a film winding system according to a second example of the present invention. The film winding system according to the second example is distinct from the system according to the first example in the construction of the elastic ring and the inner first gear.

An elastic ring 17 includes a ring portion 17a and projecting portions 17b extended from the ring portion 17a through curve portions 17c. A first inner gear 18 includes a step portion 18b provided on a flat surface thereof and a recess 18a provided on an outer periphery of the step portion 18b. The recess 18a is engaged with the curve portions 17c.

According to the above construction, in the case when the first inner gear 18 is rotated to contact the projecting portions 17b and the groove 5b of the sleeve 5, a fastening force of the elastic ring 17 against the step portion 18b is larger than the case in the first example.

This means that the friction determined by the fastening force and a holding force of the ring portion 17a against the step portion 18b can be increased. Further, the friction can be increased by appropriately shaping the curve portions 17c and the recess 18a.

In a film winding system according to the present invention, a driving force conveying path between a motor as a driving source and a spool to be driven has a clutch mechanism. In this construction, when the film is pulled until an external force applied to the spool is larger than the friction determined by the clutch mechanism, the spool is rotated by the operation of the clutch mechanism. In this way, the film is removed from the camera. Therefore, by setting the friction to be lower than such a level as to break the gears, the application of any force sufficiently large to break the film or the gears is prevented.

As a result, the inconveniences that the film is cut or the teeth of the gears for conveying the driving force are broken while the film is removed from the camera can be prevented.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A film winding system, comprising:
    a spool having a cylindrical shape and rotatably provided in a camera main body;
    a motor provided in the spool and having a main body fixed in the camera main body;
    a pinion fixed on an output shaft of the motor;
    at least one epicycle gear rotating around the pinion;
    a first inner gear in engagement with the epicycle gear;
    a second inner gear provided on an inner peripheral surface of the spool and engaged with the epicycle gear; and
    a clutch mechanism for connecting the first inner gear to the motor through a specified friction and for rotating the first inner gear with respect to the motor when a rotation torque larger than the friction is applied to the first inner gear.

2. A film winding system according to claim 1, wherein the clutch mechanism comprises:
    an elastic member including an elastic ring portion holding the first inner gear and a projecting portion extended from the ring portion away from a center of the first inner gear, the ring portion having a smaller diameter than an outer diameter of the first inner gear in the state where the ring portion is not holding the first inner gear; and
    a fixed sleeve including a housing for accommodating the first inner gear held by the elastic ring portion and a groove engaged with the projecting portion.

3. A film winding system according to claim 2, wherein the projecting portion is connected to the ring portion through a curve portion which is projected toward the center of the first inner gear, and the first inner gear has a recess on an outer periphery, the recess being engaged with the projecting portion.

* * * * *